United States Patent [19]
Doran

[11] Patent Number: 4,503,512
[45] Date of Patent: Mar. 5, 1985

[54] CELLULAR DIVISION CIRCUIT

[75] Inventor: Robert W. Doran, Palo Alto, Calif.

[73] Assignee: Amdahl Corporation, Sunnyvale, Calif.

[21] Appl. No.: 351,208

[22] Filed: Feb..22, 1982

[51] Int. Cl.³ .............................................. G06F 7/52
[52] U.S. Cl. .................................. 364/761; 364/703; 364/736
[58] Field of Search ............... 364/761, 754, 736, 703, 364/850, 606

[56] References Cited

U.S. PATENT DOCUMENTS 3,527,930  9/1970  Cocke ................................. 364/761
4,384,341  5/1983  Tague et al. ........................ 364/763

FOREIGN PATENT DOCUMENTS 56-24646  3/1981  Japan .................................. 364/761

OTHER PUBLICATIONS

Digital Division by Small Intergers, K. A. Duke, Feb. 1972.

*Primary Examiner*—Errol A. Krass
*Assistant Examiner*—Thomas G. Black
*Attorney, Agent, or Firm*—Fliesler, Dubb, Meyer & Lovejoy

[57] ABSTRACT

An improved cellular division circuit is disclosed for performing divisional computation faster than prior art systems. The cellular division circuit includes a first adder for adding a dividend and a divisor thereby forming a first remainder and a second adder for adding the dividend with the complement of the divisor thereby forming a second remainder. The circuit includes means for complementing the highest order bit of each of the first and second remainders thereby forming first and second quotient bits. A selector circuit is provided for selecting the first or second quotient bits and for selecting the first or second remainders in response to a first selection signal.

8 Claims, 14 Drawing Figures

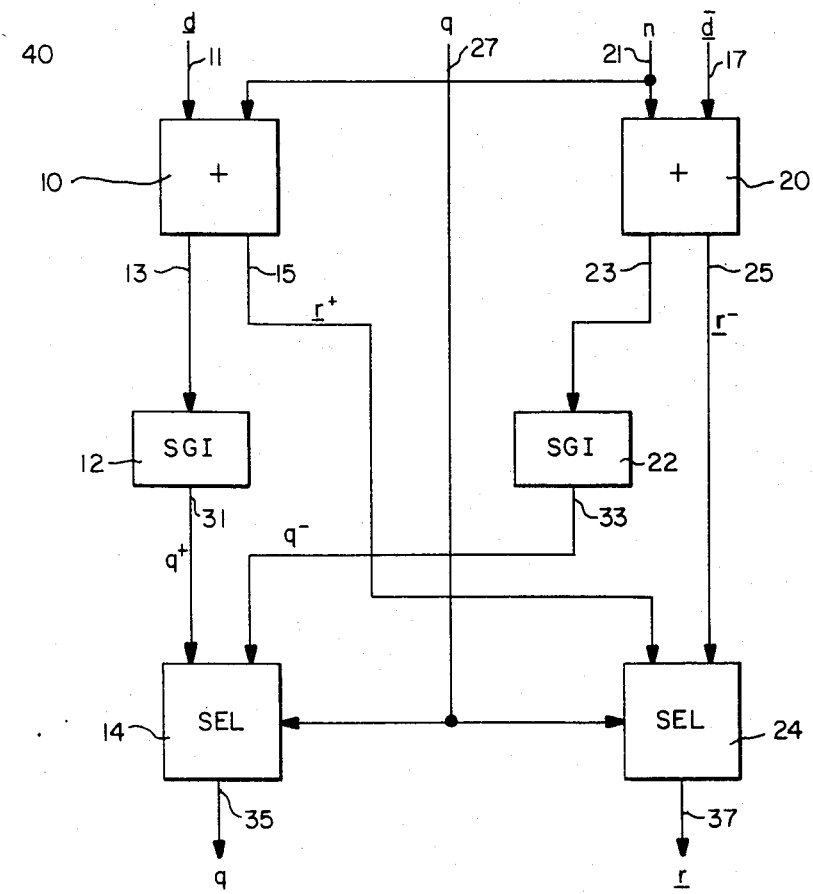
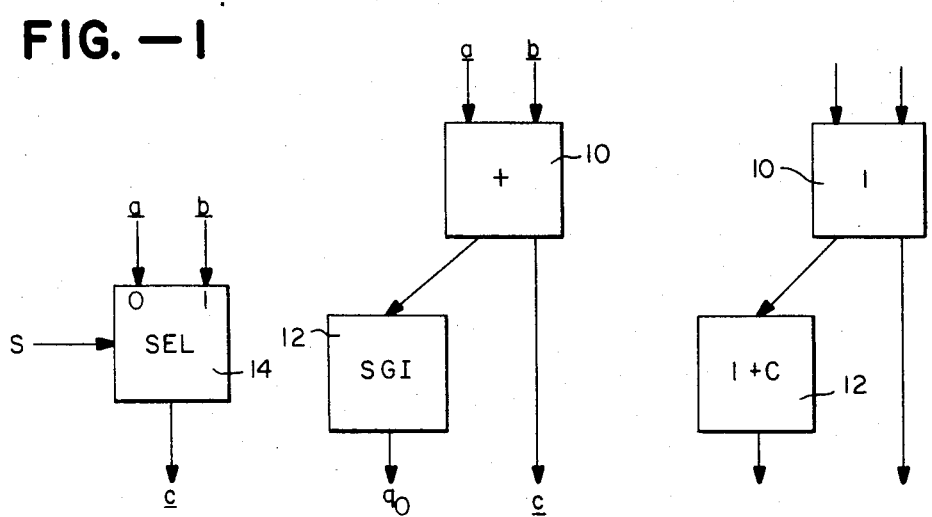
FIG.—1      FIG.—2      FIG.—3      FIG.—4

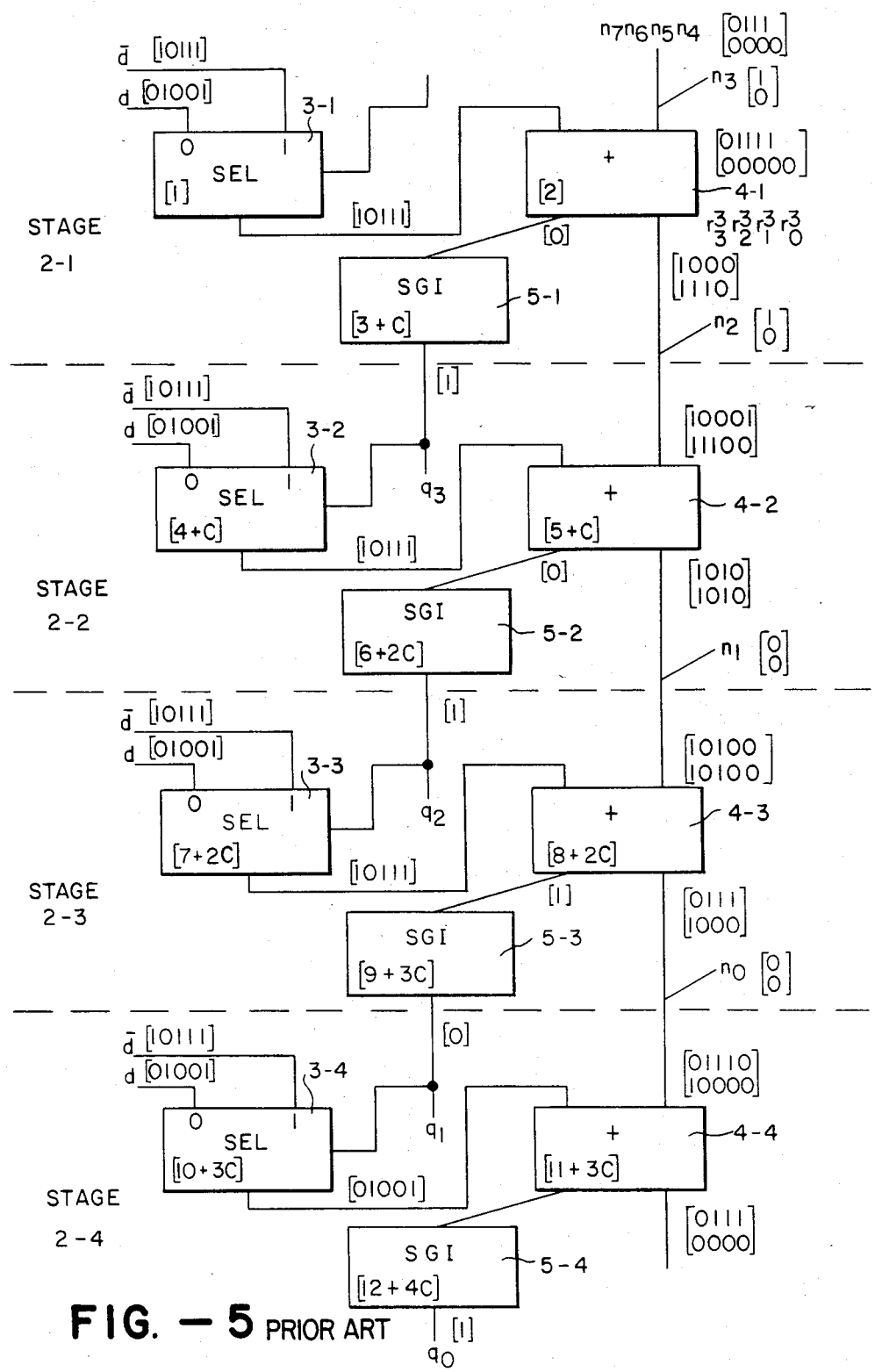
FIG. — 5 PRIOR ART

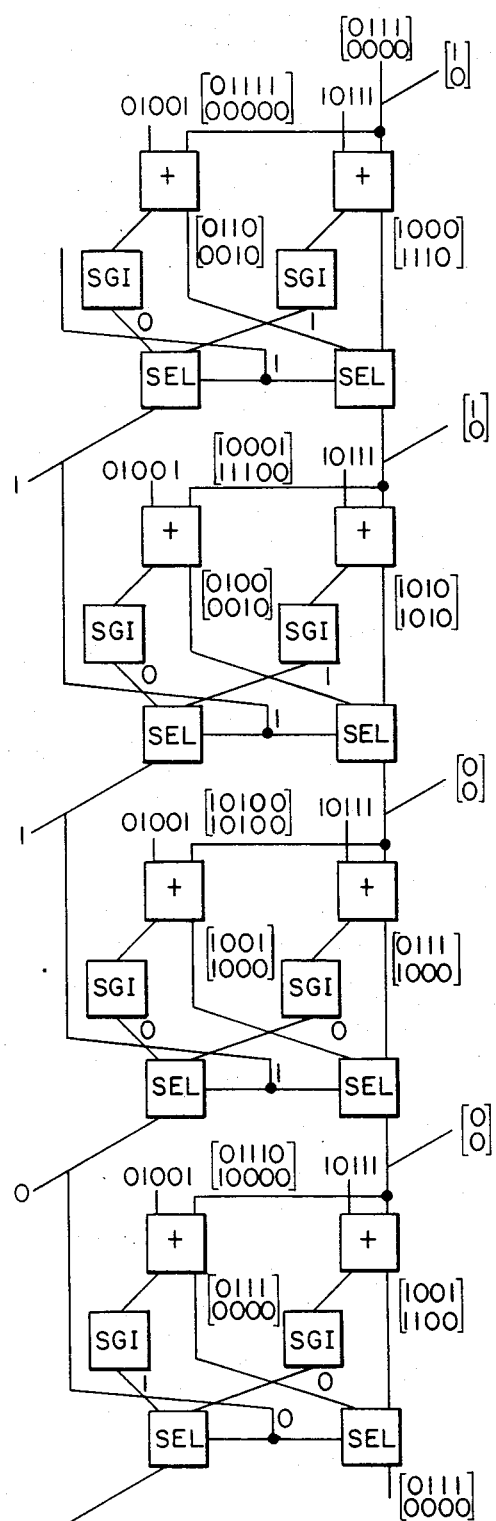
FIG.—10

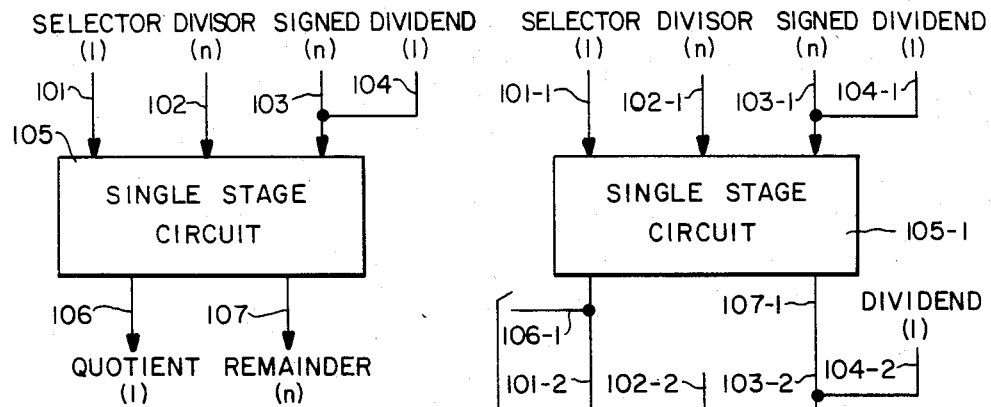
FIG.—11
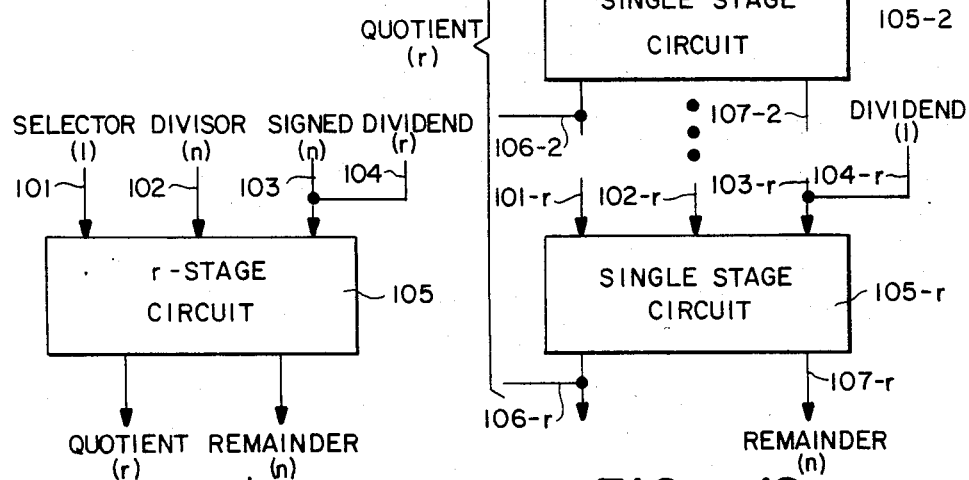
FIG.—13    FIG.—12
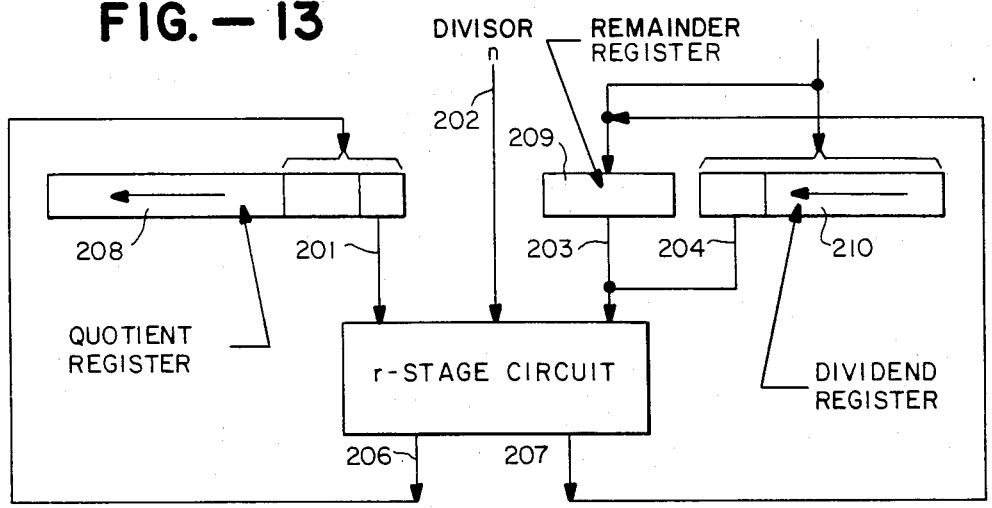
FIG.—14

CELLULAR DIVISION CIRCUIT

BACKGROUND OF THE INVENTION

The present invention relates to the field of data processing systems and specifically to the field of dividers and methods for dividing within data processing systems.

Prior art data processing systems usually require divisions of numbers using either fixed point or floating point arithmetic.

Prior art methods and apparatus for performing divisions typically employ combinations of adders and other functional units rather than employing a single dedicated divide apparatus. In such methods and apparatus, the quotient is calculated from a given divisor and a given dividend using an iterative process requiring many cycles of the system.

In order to increase the speed of divisional computations in data processing systems, specially selected division algorithms and circuits are frequently employed. Typical division algorithms rely upon sequences including both addition and subtraction steps. Such division algorithms can be characterized as either restoring or non-restoring. In restoring algorithms, typically the divisor is repeatedly subtracted in successive cycles from portions of the dividend to form successive partial remainders. When the partial remainder changes from positive to negative, the negative partial remainder is restored to the previous positive value that existed prior to the last subtraction of the divisor. Each time a subtraction occurs, a portion of the quotient is formed. Additional portions of the dividend together with the last-formed partial remainder are processed in the same way until the entire quotient and the final remainder have been formed.

In other algorithms, the step of having to restore the partial remainder is avoided. One such algorithm is described in U.S. Pat. No. 3,828,175 entitled METHOD AND APPARATUS FOR DIVISION EMPLOYING TABLE-LOOKUP AND FUNCTIONAL ITERATION.

Other algorithms, called non-restoring algorithms, form negative partial remainders but still avoid extra time for restoration of partial remainders. In an example where an addition or subtraction computation takes one cycle and where restoration is required one-half of the time, non-restoring division requires one cycle per bit and restoring division requires one and one-half cycles per bit. Hence, a 56-bit division would require 56 cycles using non-restoring division or 84 cycles using restoring division. This example indicates that restoring division takes more time and therefore is undesirable for high-speed operation. The speed of executing a non-restoring division is often increased if the divisor is normalized. When the leading bits of the partial remainder are strings of zeros (if positive) or ones (if negative), it is known that the result of a divisor subtraction (addition) will be negative (positive) without having to actually perform the subtraction. Therefore, subtraction for such leading strings may be skipped to enhance performance of the division algorithm. In general, there is no advantage to skipping strings having a length of one bit as compared to proceeding without such skipping. The advantage of skipping strings of length over four bits is not great because such strings statistically occur infrequently. Assuming for purpose of explanation, that bits in a partial remainder are 0 or 1 at random and assuming that skipping is restricted to strings of lengths of two, three and four bits, a typical division algorithm will proceed at 16/23 cycles per bit so that 56-bit divisions will take, on an average, approximately 39 cycles. This example indicates why normalization (skipping of strings of leading 0's or 1's) has been effective in the prior art to reduce the time required for division computation.

While normalization can be effective for reducing computational time, no advantage is obtained if the time required for normalization is excessive. Since normalization is usually achieved by shifting, generally a high-speed shifting capability is required to make the normalization effective. Such a capability, of course, requires additional hardware expense. Further complexity exists since the control structure for shifting must include at least a 3-way branch selecting among an add, subtract and shift.

Improved division circuits have been employed using cellular arrays. The term "cellular" implies constructing a circuit from many copies of the same cell. With cellular division circuits, steps of the basic division algorithms are performed in one cycle without need for latching data within the cycle. In typical circuits, partial remainders are kept in "carry-save" form without need to propagate the carries. Prior art cellular division circuits have been based upon both restoring and non-restoring algorithms.

Prior art cellular division circuits have not, in general, been entirely satisfactory either because of excessive hardware cost or because the computational speed is too slow.

In view of the above background, it is an objective of the present invention to provide an improved division circuit and method for use in a data processing system.

SUMMARY OF THE INVENTION

The present invention relates to an improved division circuit and method for use in a data processing system. In one embodiment, the division circuit includes first means for adding a dividend and a divisor thereby forming a first remainder, and includes second means for subtracting the divisor from the dividend thereby forming a second remainder.

Quotient means are responsive to the first and second remainders for forming first and second quotient bits, respectively.

Selector means receive the first and second quotient bits and the selector means are responsive to a selector input for selecting said first or second quotients and for selecting said first or second remainder, thereby forming a final quotient and a final remainder, respectively.

In another embodiment of the present invention, an improved division circuit and method is provided for use in a data processing system which operates in timed system clock cycles wherein the final quotient output and final remainder output of the circuit produced in one of the clock cycles is connected as selector input and dividend input, respectively, in the next subsequent cycle.

In accordance with the foregoing summary, the present invention achieves the objective of providing an improved division circuit and method for use in a data processing system.

Other features and objects of the present invention will become apparent from the following detailed description when taken in conjunction with the accompanying drawings.

BRIEF DESCRIPTION OF THE DRAWINGS

FIG. 1 depicts a block diagram of an improved division circuit according to the present invention.

FIG. 2 depicts a selector circuit which forms a component of the present invention.

FIG. 3 depicts a block diagram representation of an adder circuit and an inverter circuit which form components of the present invention.

FIG. 4 depicts the delays in the circuits of FIG. 3.

FIG. 5 depicts a prior art division circuit together with examples of data flow.

FIG. 10 depicts an example of data flow through a cellular division circuit utilizing carry/sum adders.

FIG. 11 depicts a single stage circuit of the cellular division circuit of FIG. 1.

FIG. 12 depicts the manner in which single stages are cascaded in space to form an improved cellular division circuit.

FIG. 13 summarizes the stages of FIG. 12.

FIG. 14 depicts a cellular division circuit according to the present invention which may be utilized in a system operating with timed system clock cycles.

DETAILED DESCRIPTION

Figures 6, 7:
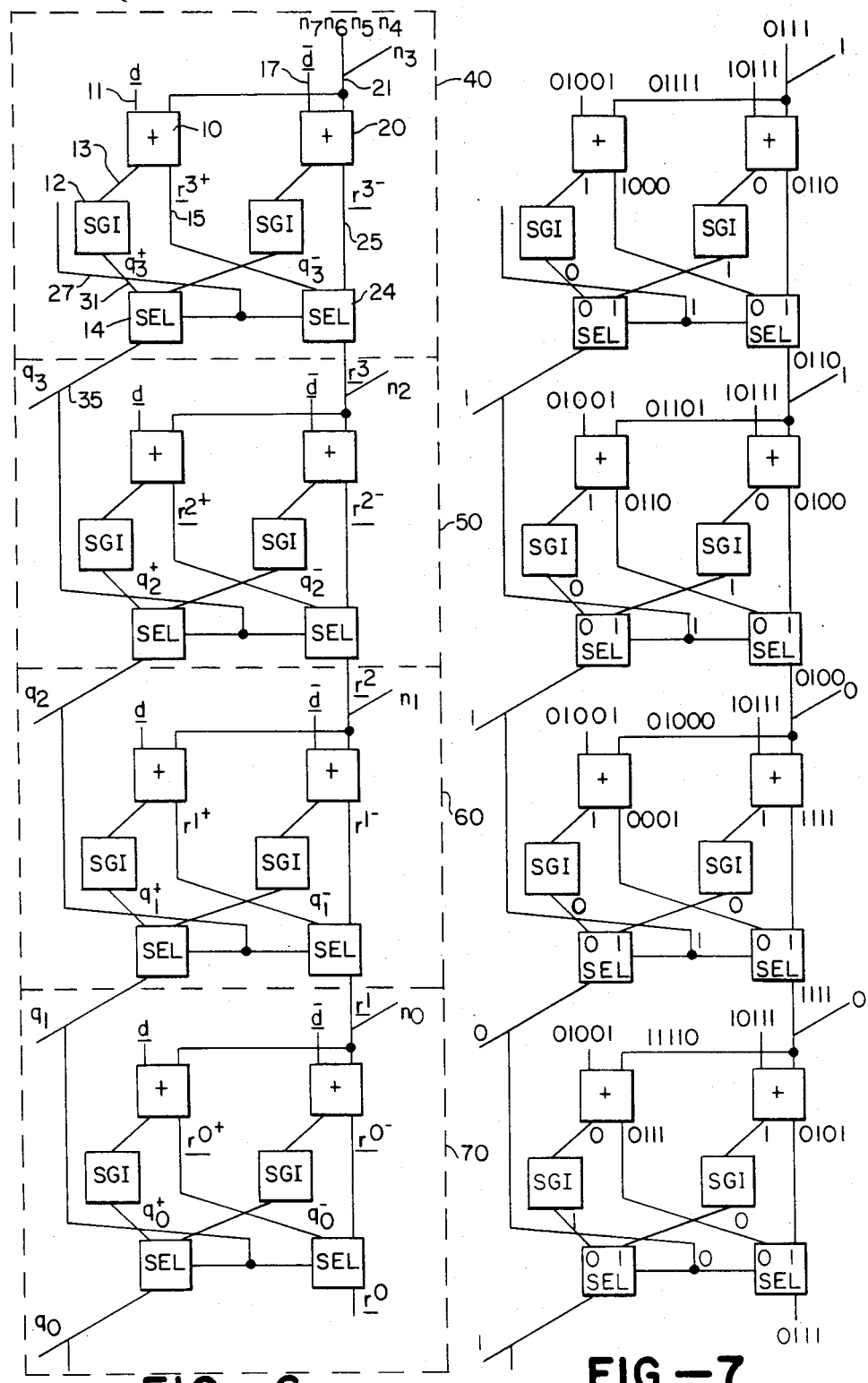
FIG. 6 depicts a generalized form of a 7-bit/4-bit cellular division circuit according to the present invention.
FIG. 7 depicts an example of data flow through the cellular division circuit of FIG. 6.

FIG. 1 depicts a block diagram of an improved division circuit according to the present invention. However, in order to illustrate the features of the present invention over that of the prior art, a brief discussion of prior art techniques will be given followed by a detailed description of the present invention. To illustrate both prior art techniques and that of the present invention, a consistent example will be utilized, namely:

124÷9=13 with remainder 7, or, in binary

1111100÷1001=1101 with remainder 0111.

The circuits illustrated will be for dividing a 4-bit divisor into a 7-bit dividend. However, the present invention applies to circuits having a width of any number of bits.

One prior art approach (the "school" approach) to division in data processing systems utilizes restoring division algorithms. As set forth in CHART I below "school" division requires a decision, at each stage of division, as to how many times a divisor will divide into a partial remainder. The decision is mechanized in restoring division algorithms by subtracting the divisor from the partial remainder. If the difference is positive, the divisor divides once into the partial remainder (and the quotient bit is one). If the difference is negative, the quotient bit is zero. In the latter case the partial remainder must be restored by adding the divisor, as set forth in CHART II.

CHART I

```
                        1101    - quotient
     divisor - 1001 / 1111100   - dividend
                     1001
                     01101      - partial remainder
                      1001
                      01000     - partial remainder
                       0000
                       10000    - partial remainder
                        1001
                        0111    - remainder
```

CHART II

```
           sign bits
              ↓
Stage      01111(100)         dividend
  1        −1001              subtract divisor
           00110(100)         positive, quotient 1

Stage      01101(00)          partial remainder
  2        −1001              subtract divisor
           00100(00)          positive, quotient 1

Stage      01000(0)           partial remainder
  3        −1001              subtract divisor
           11111(0)           negative, quotient 0
           +1001              add divisor
           01000(0)           restored partial
                              remainder Stage      10000              partial remainder
  4        −1001              subtract divisor
           00111              positive, quotient 1
           0111               remainder
```

For non-restoring division algorithms, the step of adding the divisor to restore the partial remainder can be eliminated by instead adding the divisor at the next stage where it would normally be subtracted, as set forth in CHART III.

CHART III

```
           sign bits
              ↓
Stage      01111(100)         dividend
  1        −1001              subtract divisor
           00110(100)         positive, quotient 1

Stage      01101(00)          partial remainder
  2        −1001              subtract divisor
           00100(00)          positive, quotient 1

Stage      01000(0)           partial remainder
  3        −1001              subtract divisor
           11111(0)           negative, quotient 0
```

CHART III-continued

| Stage 4 | 11110<br>+1001<br>00111<br>0111 | partial remainder<br>add divisor<br>positive, quotient 1<br>remainder |

↑
_____
sign bits

Rather than requiring circuitry for both addition and subtraction, subtraction may be performed by adding the negative of the divisor, i.e., the 2's complement, as set forth in CHART IV, where $d=9=01001_2$ and $\bar{d}=-9=10111_2$.

CHART IV

| Stage 1 | 01111(100)<br>+10111<br>00110(100) | dividend<br>add $\bar{d}$<br>positive, quotient 1 |

↓

| Stage 2 | 01101(00)<br>+10111<br>00100(00) | partial remainder<br>add $\bar{d}$<br>positive, quotient 1 |

↓

| Stage 3 | 01000(0)<br>+10111<br>11111(0) | partial remainder<br>add $\bar{d}$<br>negative, quotient 1 |

↓

| Stage 4 | 11110<br>+01001<br>00111<br>0111 | partial remainder<br>add d<br>positive, quotient 1<br>remainder |

Most implementations of binary division generate one quotient bit per machine cycle, using the adder provided for other purposes and little additional hardware. A cellular division circuit according to the present invention provides multiple quotient bits per cycle by using additional adders and thus providing faster division.

Referring now to FIG. 2, one portion of the improved division circuit includes a selector circuit (SEL) 14. If the input s to selector 14 is zero ("0"), the output c is the input a. Similarly, if the input s is one ("1"), the output c is the input b, and consequently the selector 14 can be considered a switch. The inputs and outputs of a group of signals can be of any (but the same) width and for illustration purposes, widths of 4 bits and 1 bit will be discussed. For performance estimation, the selector 14 of FIG. 2 can be considered as having one unit of delay.

In FIG. 3, an adder circuit is depicted. An adder 10 takes two signed numbers a and b and produces the sum c together with the inverse of the sum's sign q through carry lookahead circuit (SGI) 12. The widths of a and b are one more than the width c. In the particular example, a and b are 5-bits width and c is 4-bits width. The circuit is shown in two stages because in practice the sign takes longer to generate than the sum though the addition circuit and the first stages of carry lookahead circuit are usually integrated (whether the sign, or the inverted sign, is produced is irrelevant to the function of the circuit, the inverted sign is easier to describe). For performance estimation, the adder circuit of FIG. 3 has delays as depicted in FIG. 4, where C depends on the width of the input.

From the components depicted in FIGS. 2 and 3, a 4 into 7 division circuit can be constructed as depicted in FIG. 5, where each stage 2-1 through 2-4 has components similar in construction to the components depicted in FIGS. 2 and 3.

In FIG. 5, a typical prior art division circuit is depicted in which an n-bit dividend is $n_7n_6n_5n_4n_3n_2n_1n_0$ where $n_7$ is the sign of the dividend. The d-bit signed divisor $d$ is $d_4d_3d_2d_1d_0$, where $d_4$ is the sign of the divisor. The 2's complement of the divisor is written as $\bar{d}$ and the quotient is $q=q_3q_2q_1q_0$.

The partial remainders generated by each stage are $r_3^3 r_2^3 r_1^3 r_0^3$ (stage 2-1)
$r_3^2 r_2^2 r_1^2 r_0^2$ (stage 2-2)
$r_3^1 r_2^1 r_1^1 r_0^1$ (stage 2-3)
$r_3^0 r_2^0 r_1^0 r_0^0$ (stage 2-4)
= final remainder Note that the remainder could be negative, $q_0=0$, in which case a final restoration would be necessary to give the remainder in conventional positive form (not shown). The first selector 3-1 is not necessary because $\bar{d}$ is always selected and hence selector 3-1 is left in the circuit only to show its regularity.

In a typical stage 2-2 of FIG. 5, the quotient digit $q_3$ of the preceding stage is used to select between d and $\bar{d}$ as an input to the adder 4-2. The other input to the adder 4-2 is the partial remainder from the preceding stage $r_3^3r_2^3r_1^3r_0^3$ extended by the next dividend digit $n_2$ to give $r_3^3r_2^3r_1^3r_0^3n_2$. The adder 2-2 produces the next partial remainder $r_3^2r_2^2r_1^2r_0^2$ and the next quotient digit $q_2$ through SGI circuit 5-2.

FIG. 5 also depicts the flow of data through the division circuit. At a typical stage, such as stage 2-2:
$d=01001, \bar{d}=10111, q_3=1$
$\bar{d}=10111$ is selected as an input to adder 4-2.
The other adder input to adder 4-2 is
$r_3^3r_2^3r_1^3r_0^3n_1=01101$.
That sum$=r_3^2r_2^2r_1^2r_0^2=0100=$ next partial remainder and the next quotient digit $(q_2)=1$.

FIG. 5 also depicts in the lower left-hand corner of each circuit the delay in each stage of the prior art division circuit and depicts the cumulative delay at each stage. As seen in FIG. 5, the total delay is 12+4C and it can be seen that the delay per quotient bit is 3+C.

The delays illustrated can only be achieved if addition is restricted to carry/sum form, because ordinary addition requires that carries be propagated through the length of the sum, which generally requires considerable time. With carry/sum addition, the sum is left in the form of the implied sum of two numbers, and no propagation is necessary. For example in the typical stage 2-2 the input 01101 to adder 4-2 could be represented as the sum of 10001 and 11100, as illustrated in the brackets above adder 4-2. The adder will now have three input numbers with no carry propagation, as depicted in CHART V below.

CHART V

| | 10111 | 1 | 0 | 1 | 1 | 1 |
|---|---|---|---|---|---|---|
| + | 10001 | 1 | 0 | 0 | 0 | 1 |
| + | 11100 | 1 | 1 | 1 | 0 | 0 |
| = | 11010 | 1 | 1 | 0 | 1 | 0 |
| + | 101010 | 1 | 0 | 1 | 0 | 1 |

CHART V-continued

= 000100

Thus the adder can produce in one level of logic the carry/sum result [1010/1010].

The flow of data through the prior art circuit is depicted in FIG. 5 with dividend, partial remainder and remainder represented in carry/sum form.

For the present invention, the circuit would be considered sequential rather than cellular although the typical stage is replicated identically many times. The reason for the name "cellular" can be seen by describing briefly a typical stage. The basic cell is replicated in both horizontal and vertical directions and all of the circuit, apart from the carry/look ahead, is composed of the basic cell. An example circuit would contain twenty cells and four carry/lookahead sections. However, it is not necessary to discuss the level of individual cells to understand the prior art or the present invention other than the detailed description as set forth hereinbelow.

Referring again to FIG. 1, a block diagram of one stage of an improved cellular division circuit 40 according to the present invention is depicted.

The cellular division circuit depicted in FIG. 1 includes a first adder circuit 10 connected to receive an n-bit divisor signal on ($\underline{d}$) bus 11 and an n-bit dividend signal on bus 21. Adder 10 generates a first (n-1)-bit remainder signal ($\underline{r}+$) on bus 15, which comprises (n-1) bits. The inverse of the most significant bit of the added divisor and dividend signals is completed by the carry lookahead circuit (SGI) 12 connected to adder 10 by bus 13 (the implementation may actually integrate portions of 10 and 12), thereby forming a quotient bit signal ($q+$) on bus 31 for connection to selector (SEL) circuit 14.

In FIG. 1, a second adder circuit 20 is connected to receive the n-bit dividend signal on bus 21 and the complement of the n-bit divisor signal ($\overline{\underline{d}}$) on bus 17. Adder 20 generates a second (n-1)-bit remainder signal ($\underline{r}-$) on bus 25 and the most significant bit of the resultant addition is generated via bus 23 and SGI 22, as a second quotient signal ($q-$) on bus 33 for connection to selector (SEL) 14.

The second remainder signal ($\underline{r}-$) on bus 25 is connected to a second selector (SEL) 24, which also is connected to receive the first r-bit remainder signal ($\underline{r}+$) on bus 15.

Selector circuits 14, 24 are responsive to a first selection signal on bus 27, which selection signal is a quotient bit signal generated by a previous cellular stage.

In response to the selection signal on bus 27, selector circuit 14 selects the quotient bit signal on bus 31 ($q+$) or 33 ($q-$) for connection to bus 35. Selector circuit 24, in response to the selection signal on bus 27, selects the (n-1)-bit remainder signal on bus 15 ($\underline{r}+$) or bus 25 ($\underline{r}-$) for connection to bus 37.

In FIG. 1, the quotient bit signal on bus 35 is not used to select the remainder input to the next cellular stage but is utilized to select input for the next stage after that, as will be shown in FIG. 6. A major distinction of the present invention over prior art implementations is that the quotient bit generation, which is the slowest part of each stage, does not delay the initiation of the next stage. Thus the improved cellular division circuit provides faster division computation than prior art.

Referring now to FIG. 6, an illustrative diagram of an improved cellular circuit according to the present invention is depicted in which four "cells" are illustrated. Each of the cells 50, 60, 70 are identical to the cellular circuit 40 of FIG. 1 and consequently the operation of each of the individual cells of FIG. 6 need not be described in great detail.

The improved cellular circuit depicted in FIG. 6 is for a 7-bit by 4-bit divider. Using cell 50 as illustrative, rather than waiting for a preceding quotient bit to be generated for each "cell" to select between adding the divisor $\underline{d}$ or its complement $\underline{\overline{d}}$ to the partial remainder $r^3n_2$ (i.e., $r_3{}^3r_2{}^3r_1{}^3r_0{}^3n_2$), each cell of FIG. 6 adds $\underline{d}$ and $\underline{\overline{d}}$ in two separate adders. The additions produce $\underline{r^2+}$ and $\underline{r^2-}$ which are then selected, based on the previous quotient bit $q_3$ to produce the actual partial remainder $\underline{r^2}$. The previous quotient $q_3$ is also used to choose between $q_2+$ and $q_2-$ to produce the next quotient bit $q_2$.

Referring now to FIG. 7, the flow of data for the improved cellular division circuit of FIG. 1 is depicted for each cell, the particular example being $124 \div 9 = 13$ with remainder 7, or in binary, $1111100 \div 1001 = 1011$ with remainder 0111. The circuit shown is for dividing a 4-bit divisor into a 7-bit dividend. However, the principle applies to circuits of any width.

As described hereinabove, the key to the speed of the new cellular circuit is that each quotient digit is not used in the same cell or stage in which it is generated but is used in the next subsequent stage.

Figures 8, 9:
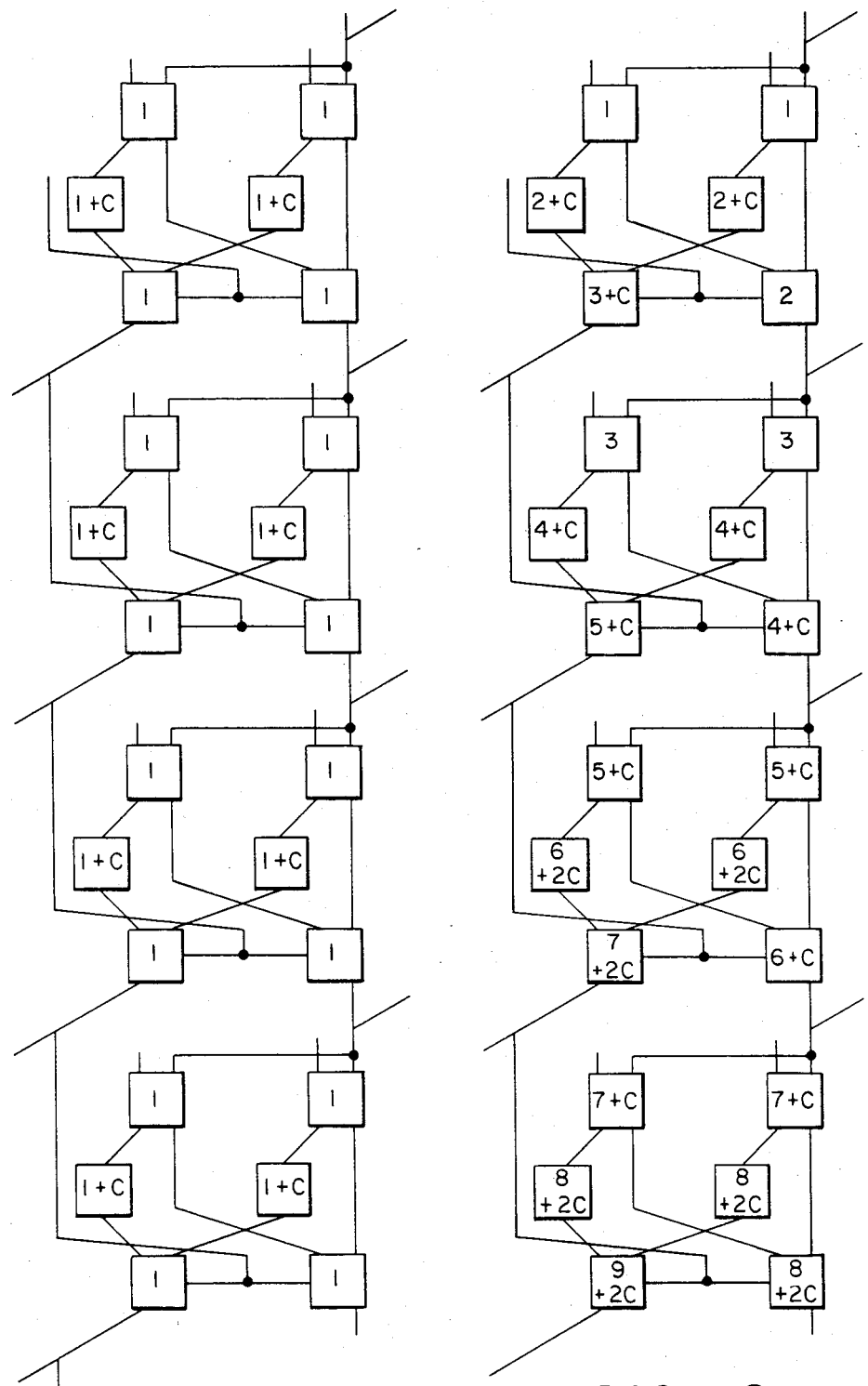
FIG. 8 depicts the delay in each stage of the cellular division circuit of FIG. 6.
FIG. 9 depicts the cumulative delay of the cellular division circuit of FIG. 6.

Referring now to FIG. 8, the delay for each element in the circuit is shown with the total delay after each element illustrated in FIG. 9. For the example given, the total delay is $9+2C$ (as opposed to $12+4C$ in prior art circuits). The delay per quotient bit is $2+C/2$ (as opposed to $3+C$ for prior art circuits). The delays indicated are achieved when the adders are implemented in carry/sum form.

Referring now to FIG. 10, the flow of data in carry/sum form is depicted through an improved cellular circuit in a preferred realization using carry/sum adders.

A single stage of an improved cellular division circuit according to the present invention as shown in expanded form in FIG. 1 is depicted in summary form in FIG. 11.

In FIG. 11, a single stage circuit 105 has as inputs a 1-bit selector signal 101, an n-bit divisor 102, and an n-bit dividend (preceded by a sign bit) comprising an n-bit segment 103 and a 1-bit segment 104.

In FIG. 1 the divisor is presented in both time and complement signed n-bit forms - these are summarized as a single unsigned n-bit divisor in FIG. 13 for descriptive simplicity.

Single stage circuit 105 produces as outputs a 1-bit quotient 106 and an n-bit remainder 107.

As illustrated in FIG. 1 and discussed in detail hereinabove, it is possible to concatenate single stage circuits in space.

As illustrated in FIG. 12, a series of single stage circuits 105 are concatenated to form stages 105-1, 105-2, . . . 105-r.

The first stage 105-1 receives as an input the 1-bit selector signal 101-1 and the first n-bits of dividend 103-1.

All stages 105 receive the same n-bit divisor 102-1, 102-2, . . . 102-r. Each stage also receives an additional 1-bit of the dividend 104-1, 104-2, . . . 104-r.

Subsequent stages after the first stage 105-1 are connected so that the quotient output of each stage is connected to the selector input of the next stage. For example, the output 106-1 of single stage circuit 105-1 is connected to single stage circuit 105-2 as input 101-2. The remainder output of each stage 105 is connected to the n-bit dividend input of the next stage. For example, output 107-1 of stage 105-1 forms the 103-2 dividend input to stage 105-2.

The final stage 105-r produces the n-bit remainder 107-r and the r-bit quotient is formed by the quotient outputs of each stage 106-1, 106-2, . . . 106-r.

As depicted in FIG. 13, an r-stage circuit 105 can be described which receives as an input a 1-bit selector 101, and n-bit divisor 102, a dividend (including sign) comprising an n-bit segment 103 and an r-bit segment 104, which produces an r-bit quotient 106 and an n-bit remainder 107 (i.e., a (n-1+r)/n divisor circuit).

The foregoing description has described a cellular division circuit which is concatenated in space. However, as well as being concatenated in space, a cellular division circuit according to the present invention may be used in a system operating in timed system clock cycles where one divisor circuit is used repeatedly to accomplish a wide division in accordance with the foregoing description.

For example, FIG. 14 depicts an improved division circuit (in the form (n-1+r)/n) which may be used "p" times to accomplish a [(n-1)+(pxr)]/n division and produce an (pxr)-bit quotient.

The r-stage cellular circuit 205 is augmented in FIG. 14 with a (pxr)-bit quotient register 208, an n-bit remainder register 209, and a (pxr)-bit dividend register 210.

Prior to the first cycle of operation, the quotient register 208 is cleared to zero, the first n-bits of the signed dividend are loaded into the remainder register 209, and the remaining bits of the dividend are loaded into the dividend register 210.

During each cycle of operation, the r-stage circuit 205 accepts the rightmost bit of the quotient register 208 as a selector input 201, the constant n-bit divisor 202 and the n-bits of the remainder register 209 and the rightmost r-bits of the dividend register 210 as dividend inputs 203 and 204.

Circuit 205 thereby produces the r-bit quotient 206 and the n-bit remainder 207.

At the same time, the contents of the quotient register 208 are shifted left r-bits, and the contents of the dividend register 210 are shifted left r-bits (the leading r-bits being lost).

At the conclusion of each system cycle, r-bit quotient 206 is loaded into the rightmost r-bits of the quotient register 208 and the n-bit remainder is loaded into the remainder register 209.

After "p" cycles of operation, the (pxr)-bit quotient is contained within the quotient register 208 and the n-bit remainder is contained within remainder register 209.

For each cycle of operation r-bits of quotient are generated. With current technology a 4-stage circuit is reasonable for 1 cycle. Thus a 56-bit division would take 14 cycles, in contrast to the 39 cycles taken for "nonrestoring with skipping" circuit of the prior art.

In summary, an improved cellular division circuit and method has been described which can operate in a "space" domain with the stages being concatenated in space, and alternatively for a "time" domain, in which a singular circuit is capable of providing the desired result while operating in timed-system cycles. In a preferred implementation, the improved circuit would utilize adders in a carry/sum form.

Accordingly, the following claims are intended to cover a cellular division circuit according to the present invention whether operating in a time domain or a space domain or other modifications or combinations of the foregoing, and as such it is intended that the scope of the present invention only be limited by the accompanying claims.

What is claimed is:

1. In a data processing system, a plurality of cascaded cellular division circuits, each of said cascaded circuits comprising:
   first adder means for adding an n-bit dividend and an n-bit divisor thereby forming a first n-bit remainder,
   second adder means for adding said n-bit dividend with the complement of said n-bit divisor thereby forming a second n-bit remainder,
   means for complementing the highest order bit of each of said first and second remainders, thereby forming first and second quotient bits, respectively, and
   selector means connected to receive said first and second quotients bits and said first and second remainder bits, said selector means responsive to a quotient bit signal from a preceding cascaded circuit for selecting said first or second quotient bit and said selector means responsive to said quotient bit signal for selecting said first or second remainders.

2. In a data processing system operating in timed system cycles, a cellular division circuit comprising:
   first adder means for adding an n-bit dividend and an n-bit divisor within one system cycle thereby forming a first n-bit remainder,
   second adder means for adding said n-bit dividend with the complement of said n-bit divisor within said one system cycle thereby forming a second n-bit remainder,
   said first and second adder means including means for complementing the highest order bit of each of said first and second remainders thereby forming a first and a second quotient bit, respectively, and
   selector means connected to receive said first and second quotient bits and said first and second remainder bits, said selector means responsive to a quotient bit signal from a preceding system cycle for selecting said first or second quotient bits and for selecting said first or second remainders.

3. A cellular division circuit comprising:
   a first adder circuit for adding an n-bit dividend and an n-bit divisor thereby forming a first n-bit remainder,
   a second adder circuit for adding said n-bit dividend with the complement of said divisor thereby forming a second n-bit remainder,
   means for complementing the highest order bit of each of said first and second remainders, thereby forming first and second quotients bits, respectively,
   first selector means connected to receive said first and second quotient bits, said first selector means responsive to a first selection signal for selecting said first or second quotient bits thereby forming a second selection signal,
   second selector means connected to receive said first and second remainder bits, said second selector means responsive to said first selection signal for selecting said first or second remainders, and means supplying said first selection signal so that said first selection signal is one value if said n-bit dividend is smaller than said n-bit divisor and is an other value if said n-bit dividend is not smaller than said n-bit divisor.

4. A division apparatus for dividing an (n+r)-bit dividend by a n-bit divisor, comprising:
(r+1) cascaded stages $S_i$, as i goes from 0 to r, each stage $S_i$ including,
first means for subtracting said divisor from a partial dividend $R_i$ of said dividend to form a first remainder,
second means for adding said divisor to said partial dividend $R_i$ to form a second remainder,
first quotient means responsive to said first means to form a first quotient bit of one value if said first remainder is positive or of an other value if said first remainder is negative,
second quotient means responsive to said second means to form a second quotient bit of one value if said second remainder is positive or of an other value if said second remainder is negative,
selector means responsive to a selection signal for selecting said first or said second quotient bit and for selecting said first or said second remainder thereby forming a final quotient and final remainder;
said selection signal causing said selector means to select said first remainder and said first quotient bit for a first stage $S_0$ of said cascaded stages and for each of the succeeding ones of said cascaded stages $S_i$, as i goes from 1 to r, said selection signal causing said selector means to select said first remainder and said first quotient bit if the final quotient from the preceding $S_{(i-1)}$ is said one value, or to select said second remainder and said second quotient bit if the final quotient from said preceding stage $S_{(i-1)}$ is said other value, and
means for supplying the n high-order bits of said dividend as said partial dividend $R_0$ to said first stage $S_0$, and
means for supplying said final remainder from the preceding stage $S_{(i-1)}$ and the (n+i) order bit from said dividend as said partial dividend $R_i$ for the balance of said cascaded stages $S_i$, for i equal to 1 through r.

5. A division apparatus as in claim 4 wherein said second means includes means to form said second remainder by addition of said dividend to the complement of said divisor.

6. The apparatus as in claim 4 including means for representing said divisor, said dividend and said remainders in carry/sum form and wherein said first and second means include carry/save adders.

7. A circuit as in claim 4 further including means for complementing the highest order bit of each of said first and second remainders thereby forming said first and second quotient bits, respectively.

8. A division apparatus for dividing an (n+r)-bit divided by an n-bit divisor, comprising a division circuit operating in timed cycles including,
first means for subtracting said divisor from a partial dividend $R_i$ to form a first remainder,
second means for adding said divisor to said partial dividend $R_i$ to form a second remainder,
first quotient means responsive to said first means to form a first quotient of one value if said first remainder is positive or a first quotient of an other value if said first remainder is negative,
second quotient means responsive to said second means to form a second quotient of one value if said second remainder is positive or a second quotient of an other value if said second remainder is negative, and
selector means responsive to a selection signal for selecting said first or said second quotient and for selecting said first or said second remainder, thereby forming a final quotient and a final remainder, and
said selection signal causing said selector means to select said first remainder and said first quotient for a first timed cycle in said division circuit and, for each of the succeeding timed cycles, said selection signal causing said selector means to select said first remainder and said first quotient if the final quotient from the preceding timed cycle is said one value or said second remainder and said second quotient if the final quotient from said preceding timed cycle is said other value, and
means for supplying the n high order bits for said dividend as said partial divident $R_0$ during said first timed cycle, and
means for supplying said final remainder from the preceding timed cycle and the (n+i) order bit from said dividend as said partial dividend $R_i$ for the balance of said timed cycles, for i equal to 1 through r.

* * * * *